Dec. 13, 1955        A. R. UUS        2,726,471
MOTORIZED FISH BAIT AND HOOK CARRIER
Filed July 6, 1954        2 Sheets-Sheet 1
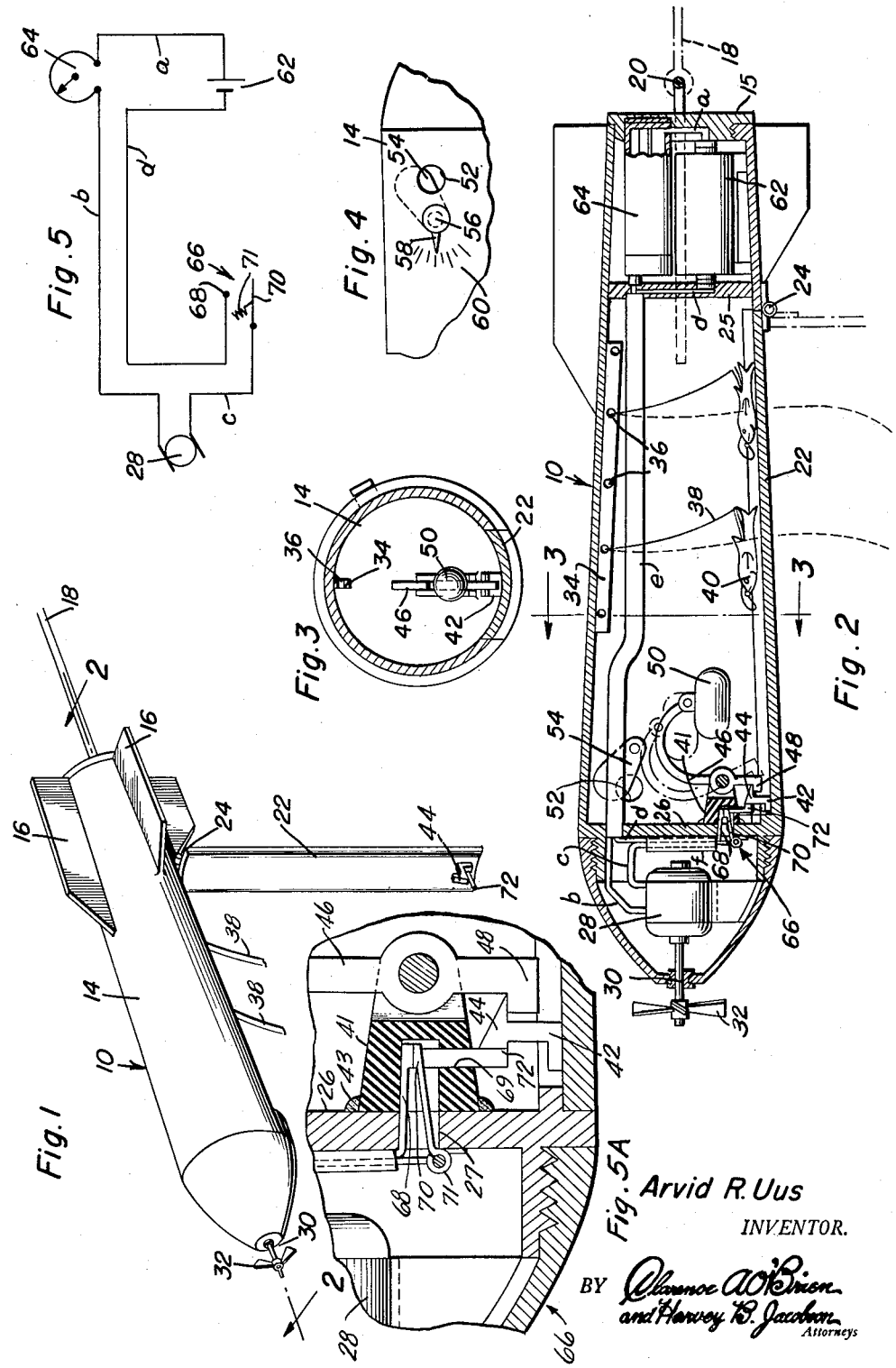
Arvid R. Uus
INVENTOR.
BY Clarence A. O'Brien
and Harvey B. Jacobson
Attorneys

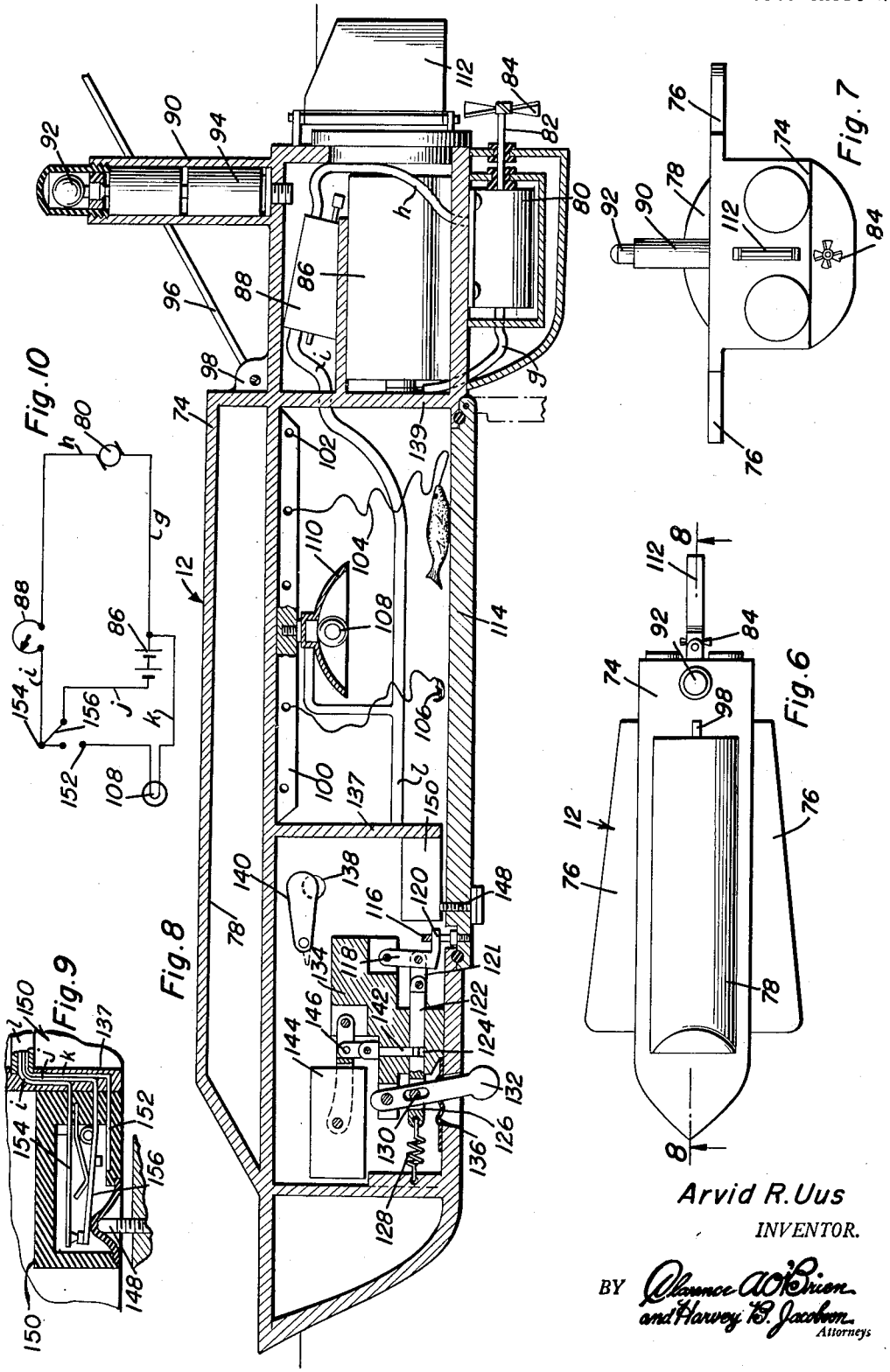

United States Patent Office 2,726,471
Patented Dec. 13, 1955

2,726,471

MOTORIZED FISH BAIT AND HOOK CARRIER

Arvid R. Uus, Greystone Park, N. J.

Application July 6, 1954, Serial No. 441,308

5 Claims. (Cl. 43—17.5)

This invention relates to a motorized fish bait and hook carrier and more specifically provides a device for attachment to a fishing line wherein the baited hook will be powered to a designated spot and then released so that the hook will drop into the water for carrying out the fishing procedure in the usual manner.

An object of this invention is to provide a motorized fish bait and hook carrier including a hollow body having propelling means thereon for attachment to a fishing line, and a plurality of baited hooks attached thereto wherein the entire device will move out into the water to a predetermined distance wherein the baited hooks will be discharged and the fishing operation carried out in the normal manner.

Another object of the present invention is to provide a device as set forth in the preceding objects wherein the device is simple in construction, easy to use, easy to control, well adapted for its intended purposes, and relatively inexpensive to manufacture.

A further object of the present invention is to provide a device as set forth in the preceding objects wherein the distance travelled prior to release of the baited hooks may be easily adjusted and the device may be easily "set" for a repeat performance.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view showing the motorized fish bait and hook carrier of the present invention attached to a fishing line and having the hook supporting lines depending therefrom;

Figure 2 is a longitudinal, vertical sectional view taken substantially along section line 2—2 of Figure 1 showing the details of construction of the device of the present invention;

Figure 3 is a transverse, vertical sectional view taken substantially along section line 3—3 of Figure 2 showing the structural relationship of the various elements of the present invention;

Figure 4 is a detailed, side elevational view showing the aperture with the regulated opening wherein the rate of intake of water may be quickly and easily adjusted;

Figure 5 is a schematic showing of the wiring diagram for the electric motor that propels the device;

Figure 5A is a fragmentary view in longitudinal vertical section illustrating details of construction of the device drawn to a larger scale for clearer illustration of the same.

Figure 6 is a top plan view of a modified form of the motorized fish bait and hook carrier of the present invention;

Figure 7 is a rear end view showing the details of the body construction of the modified form of the present invention;

Figure 8 is a longitudinal, vertical sectional view taken substantially along section line 8—8 of Figure 6 showing the various details of construction of the modified form of the present invention;

Figure 9 is a detailed sectional view showing the construction of the double switch actuated by the pivotal closure; and Figure 10 is a schematic view showing the wiring diagram for the propelling motor of the modified form of the present invention.

Referring now specifically to the drawings, it will be seen that the numeral 10 generally designates the motorized fish bait and hook carrier as illustrated in Figures 1–5 and the numeral 12 indicates the modified form of the device as illustrated in Figures 6–10. Referring now specifically to Figures 1–5, it will be seen that the motorized fish bait and hook carrier 10 of the present invention includes a generally cylindrical hollow body 14 having stabilizing fins 16 spaced about the periphery at the rear portion thereof. The rear end 15 of the body 14 is attached to a fishing line 18 by a suitable eye member 20. A pivoted closure 22 is secured to the bottom of the body 14 by hinge means 24 and a latch means as described hereinafter. A transverse partition or wall 26 extends across the forward portion of the body 14 and houses an electric motor 28 having a power shaft 30 extending through the forward wall of the body 14 and terminating with a propeller 32 for propelling the body 14. Secured to the undersurface of the upper portion of the body 14 directly over the closure member 22 is a depending rib 34 having a series of apertures 36 spaced longitudinally thereof for attaching leader lines 38 that have baited hooks 40 secured to the lower ends thereof wherein the baited hooks 40 will be discharged from the opening when the closure 22 is pivoted to a depending or open position.

The closure 22 is provided with an upstanding member 42 having a projecting lug 44 at its upper end for engagement with a latch bolt 46 having a projecting foot 48 at its lower end for engagement under the projecting lug 44 for retaining the closure 22 in closed position. The upper end of the latch bolt 46 is generally U-shaped and includes a float member 50 pivotally secured thereto wherein the float 50 will be urged upwardly by water, thereby releasing the projection 48 from the lug 44, thereby permitting the closure 22 to pivot downwardly about hinge means 24. An aperture 52 is provided in the body 14 adjacent the forward wall 26 and a pivoted closure 54 is mounted on a pivot pin 56 for selective closure of the aperture 52. A pointer 58 is secured to the pin 56 and indicia 60 is provided wherein the relative position of the closure 54 may be easily determined, thereby regulating the flow of water into the interior of the body 14 wherein the distance of travel of the body 14 in the water will determine the amount of water that enters the aperture 52, thereby determining the point of opening of the closure 22 and the discharge of the baited hooks 40.

A suitable battery 62 is connected to the motor 28 through a rheostat 64 or other similar control means and a switch, generally indicated by the numeral 66. The battery 62 and rheostat 64 are housed in the body 14 between the rear end 15 and a rear partition 25 in said body. The switch 66 includes a stationary contact member 68 and a pivoted contact member 70 that is positioned in the path of movement of a projection 72 secured to the upstanding member 42. The battery 62, motor 28 and rheostat 64 are connected in a circuit by any suitable conductors. As shown, a conductor $a$ connects one side of the battery 62 to one side of the rheostat 64, the other side of which is connected by a conductor $b$ to one side of the motor 28. The other side of the motor 28 is connected by a conductor c to the pivoted contact 70. A conductor d connects the other side of the battery 62 to the fixed contact 68. The conductors b, d extend through a water-proof sheath e in the body 14 suitably connected to the partitions 25, 26. The conductors c, d extend through a holding sheath f on the front of the partition 26 and the conductors a and d adjacent the battery 62 and rheostat 64 are embedded in the rear end 15 and the partition 25. All of the conductors are suitably insulated. The projection 72 extends up through an aperture 69 in a resilient casing 41 formed by a hollow boss of rubber suitably secured, as at 43, to the partition 26 in alignment with an opening 27 in the partition 26 through which the contacts 68, 70 extend into said casing 41, said casing 41 pivotally mounting the latch bolt 46 and whereby the compartment with the motor 28 is retained in a water-tight condition, inasmuch as the resilient casing closely surrounds the projection 72 when it is inserted in the aperture 69 and engaging the movable contact 70, thereby closing the circuit for energizing the motor 28. As the motor 28 rotates, thereby rotating the propeller 32, the body 14 will be pulled through the water until such time as water enters the opening 52 and raises the float 50, thereby unlatching the projecting lugs 48 and 44 for permitting downward pivotal movement of the closure 22. As the closure 22 pivots downwardly the projection 72 is retracted out of the opening 69, thereby permitting the movable contact 70 to move away from the stationary contact 68 and stopping the motor 28. Any suitable means, such as the expansion spring 71, as shown in Figures 5 and 5A may be provided for positively moving the contact 70 away from the contact 68 to close the opening 69 when the projection 72 is retracted. The baited hooks 40 are discharged from the body 14 and the fishing line 18 and the leader lines 38 are then utilized in the normal manner.

Referring now specifically to the modified form of the motorized fish bait and hook carrier 12 as illustrated in Figures 6–10, it will be seen that a body 74 is provided with outwardly extending fins 76 for stabilizing the device and a hollow baffle portion 78 is provided for balancing and retaining the device in an upright position. A motor 80 with a drive shaft 82 and a propeller 84 is positioned at the rear of the body 74 and suitable batteries 86 are provided with a control rheostat 88 for energizing the motor 80 for propelling the body 74 through the water. The rear portion of the body 74 is provided with an upstanding tubular member 90 having a water-proof light bulb 92 at its upper end and energized by suitable batteries 94 wherein the light 92 acts as an indicator for showing the position of the body 74 at all times, and especially at night.

The body 74 is attached to a fishing line 96 by the use of a suitable eye member 98 and the interior of the body 74 is provided with a depending longitudinal rib 100 with a plurality of apertures 102 for the securing of leader lines 104 having baited hooks 106 on the free ends thereof. A light bulb 108 is secured to the upper surface of the interior of the body 74 with a suitable reflector 110 for attracting the fish toward the body 74, thereby increasing the chances of catching a fish. Pivotally positioned on the rear of the body 74 is a rudder 112 for stabilizing the motion of the body 74 so that it travels in a straight line. A pivoted closure 114 is provided in the lower end portion of the body 74 and includes an eye member 116 for engaging a pivoted latch 118 that has a projection 120 thereon for engaging the eye member 116. The pivotal latch 118 is pivotally connected by a linkage 121 to a reciprocating bar 122. The bar 122 is provided with a centrally disposed recess 124 and a slot 126 adjacent one end thereof with the free end being attached to a tension spring 128 that is secured to an adjacent wall of the body 74. The slot 126 is provided with a transverse pin 130 for pivotally and slidably receiving an actuating handle 132 that is pivotally mounted on a supporting block 134 and reciprocates the bar 122. A rubber gasket 136 is provided for making the interior of the compartment water-tight except through the aperture 138 that is provided with the closure 140. A vertically reciprocating member 142 is connected to a float 144 through a pivotally mounted linkage 146 wherein the float 144 will be raised by water entering the aperture 138 whereby the reciprocating member 142 is retracted, thereby releasing the reciprocating bar 122 and permitting the spring 128 to retract the projecting lug 120 from the eye member 116 for allowing the closure 114 to pivot downwardly to an open position. This permits the baited hooks 106 to be positioned below the body 74 for catching the fish.

The closure 114 is provided with an adjustable abutment 148 for engaging a switch as generally indicated by the numeral 150 in Figure 9. The switch includes a stationary contact 152 at the lower end thereof and a stationary contact 154 adjacent the upper end thereof. A resilient contact arm 156 is positioned centrally of the contact members 152 and 154 and the resilient arm 156 includes two contacts wherein the abutment 148 will actuate the motor 80 when the resilient contact 156 engages the upper contact 154. When the pivotal closure 114 is open and the abutment 148 is retracted, the resilient contact 156 engages the lower contact 152, thereby energizing the light bulb 108 within the body 74.

The batteries 86 are connected in series and one side of one battery is connected by a conductor g to one side of the motor 80. A conductor h connects the other side of the motor 80 to one side of the rheostat 88, the other side of which is connected by a conductor i to the stationary contact 154. A conductor j connects one side of the other battery 86 to the contact arm 156. A jumper conductor k connects the conductor g to the contact 152 with the light bulb 108 interposed therein. Between forward and rearward partitions 137, 139 in the body 114, corresponding to partitions 26, 25 of the first described embodiment, the partition 137 carrying the switch 150, the conductors g, h, i, j and k are enclosed in a sheath l suitably connected to said partitions 137, 139. The conductors g, h, i, j, and k are all insulated.

The operation of the device of the present modified form is substantially the same as that illustrated in Figures 1–5. The propeller 84 drives the body 74 until such time as the float 144 is raised by the water entering the opening 138 whereby the motor 80 is then deenergized and the pivotal closure 114 is released, thereby permitting discharge of the baited hooks 106 and the illumination of the light bulb 108. Further, the device may be constructed of any suitable materials and in any desirable shape.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A motorized fish bait and hook carrier comprising a hollow body, means for propelling said body, a closure pivoted in said body for opening to admit water into the body, a baited fishhook secured to the interior of said body and adapted to depend below the body when the closure is opened, and means responsive to the rise of water in said body for controlling opening of the closure to permit the baited fishhook to depend below said body.

2. The structure as defined in claim 1 wherein said propelling means includes a propeller and a source of power for rotating said propeller.

3. The structure as defined in claim 1 wherein said means for controlling opening of said closure includes an automatically operated latch and a water inlet opening in said body having an adjustable cover for admitting water at a predetermined rate whereby the latch will be actuated when the body is filled with water through the opening whereby the distance travelled can be regulated by adjusting the size of the water inlet opening.

4. The structure as defined in claim 1 wherein power means is provided for actuating said propelling means, said closure including means interconnecting the closure and power means for stopping the power means when the closure is opened.

5. The structure as defined in claim 1 wherein said body is provided with a light bulb positioned over said closure, and means associated with said closure for illuminating the light bulb when the closure is opened, thereby attracting fish.

References Cited in the file of this patent
UNITED STATES PATENTS

| | | |
|---|---|---|
| 1,173,827 | Marsh | Feb. 29, 1916 |
| 1,267,248 | Monighan | May 21, 1918 |
| 1,850,296 | Vermeulen | Mar. 22, 1932 |